United States Patent [19]

Kobori

[11] 4,152,065
[45] May 1, 1979

[54] CAMERA BODY AND METHOD OF MANUFACTURE THEREOF

[75] Inventor: Toshio Kobori, Sakai, Japan

[73] Assignee: Minolta Camera Kabushiki Kaisha, Osaka, Japan

[21] Appl. No.: 829,853

[22] Filed: Sep. 1, 1977

[30] Foreign Application Priority Data

Sep. 7, 1976 [JP] Japan .................................. 51-107602
Sep. 21, 1976 [JP] Japan .................................. 51-113879

[51] Int. Cl.² ............................................. G03B 17/02
[52] U.S. Cl. ..................................................... 354/288
[58] Field of Search ............... 354/288, 286, 152, 187, 354/155, 275, 202, 203

[56] References Cited

U.S. PATENT DOCUMENTS

| | | | |
|---|---|---|---|
| 3,380,361 | 4/1968 | Winkler | 354/203 |
| 4,067,032 | 1/1978 | Yoshikawa et al. | 354/288 |

FOREIGN PATENT DOCUMENTS

| | | | |
|---|---|---|---|
| 221358 | 5/1962 | Austria | 354/202 |
| 1147839 | 4/1963 | Fed. Rep. of Germany | 354/288 |
| 425415 | 3/1935 | United Kingdom | 354/187 |

OTHER PUBLICATIONS

The Asahi Camera, Japanese Magazine, Nov. 1967, p. 242.
Popular Photography, Minox 35 El, Jul. 1976, p. 43.
Modern Plastics, vol. 25, No. 11, Jul. 1948.
Plastics Engineering, pp. 107-111.

*Primary Examiner*—Donald A. Griffin
*Attorney, Agent, or Firm*—Wolder, Gross & Yavner

[57] ABSTRACT

A camera body, particularly useful for a camera of the interchangeable lens type, includes a front metal unit having a mount member to which an interchangeable lens is attachable, a rear metal unit having an exposure framing aperture, film rail surfaces, an abutting surface on which a film pressure plate is abuttable and a mount surface to which the front metal unit is attached, and a body proper molded of a reinforced plastic with the rear metal unit imbedded therein and having a pair of box shaped main portions which are disposed at opposite sides of the rear metal unit and a pair of laterally extending portions which interconnect the main portions. The rear metal unit is provided with perforations formed as casting holes and packed and filled with the plastic and is of box shape with the front wall being open and the four peripheral walls being continuous with each other. Upon molding of the plastic body proper, smooth flow of the molten plastic is achieved and blow holes are minimized in the main portions when the molten plastic is injected into the cavity through the perforations of the rear metal unit so that it flows into the spaces of the cavity corresponding to the main portions through the spaces of the cavity corresponding to the interconnecting portions.

20 Claims, 6 Drawing Figures

CAMERA BODY AND METHOD OF MANUFACTURE THEREOF

BACKGROUND OF THE INVENTION

The present invention relates generally to an improved camera body and to a method for manufacturing the same from plastic, and it relates more particularly to an improved camera body which is highly adapted for use with an interchangeable objective lens.

Hitherto, it has been a general practice to use a light alloy casting such as an aluminum alloy for a camera body. However, a camera body of a light alloy casting is costly and still heavy in weight, and thus there is a great demand for a camera body which is both light in weight and low in cost.

To meet this demand, many attempts have been made to produce a camera body of plastic, particularly cameras of a medium size, which are equipped with a so-called lens shutter. These structures have been already employed in the field of a camera industry. However, in the case where the camera body is made only of a plastic, the following shortcomings are experienced:

(a) The coefficient of thermal expansion of a plastic is extremely large, as compared with those of light alloys such as aluminum alloys. Even glass-fiber-reinforced plastic affords a coefficient of thermal expansion twice as large as that of aluminum. This results in the failure to achieve the dimensional accuracy required for a camera, and deformation due to the cooling following molding, with the resulting impaired flatness of the film abutting surface.

(b) Recently, cameras have been equipped more or less with electric circuits. However, the cameras made of plastic are not suited to a body-groundinging system which is an essential factor in simplifying the wiring of such an electric circuit.

These shortcomings are common in cameras having plastic bodies. The above shortcoming (a) particularly leads to the lowering in the performance of a high-class camera of the lens interchangeable type, such as a single lens reflex camera and the like. For instance, assuming that the thickness of the plastic portion of a camera body is about 25 mm, and that the serviceable temperature range of the camera is from $-20°$ C. to $+50°$ C., then there occurs in the camera a dimensional error of the order of at least 60 $\mu$m. This dimensional error far exceeds the allowance for a camera having a large aperture in an interchangeable lens having a small depth of focus, because the above dimensional error has a close bearing upon the so-called flange back (the distance between the mount surface of a camera body for an interchangeable lens and the film plane). Meanwhile, in the case of a camera having an interchangeable lens, consideration should be given to a heavy interchangeable lens such as a telephoto lens. In case the camera body is made of plastic in its entirety, then its strength is less than that of a light alloy camera body, and thus such a camera is not suitable for use with a large-size interchangeable lens and imposes a limitation on the useable interchangeable lenses. To avoid this shortcoming, it has been proposed to use a glass-fiber-reinforced plastic. However, desired machinability can not be achieved and thus a difficulty arises in the treatment of the film-abutting surface on which the film pressure plate is abuttable. (This will hereinafter be referred to as the film-abutting surface). Accordingly, such a camera finds no application for a large aperture lens having a small depth of focus.

These shortcomings restrict the progress of the manufacture of cameras having camera bodies made of plastic, particularly the manufacture of those cameras having interchangeable lenses. A composite body consisting of a metal block and a plastic body is described in the Japanese laid-open patent publication No. Sho 51-6719, as a proposed solution to the aforesaid shortcomings. In the aforesaid composite camera body, a front metal plate, to which an interchangeable lens may be attached, and a metal block having an attaching surface for the aforesaid metal plate and an aperture delineating or defining an exposure frame, and an abutting surface for the film, are made of a light alloy, and the metal block thus prepared is used as an insert for the plastic-molding of the body proper of the camera, to which a part of the film feeding mechanism may be attached. This structure reduces not only variation in flange back due to temperature change but also deformation in respective portions of the body proper due to cooling, as in the case of a camera body made of a light alloy, and in addition allows the machining of the abutting surface of the film with a high accuracy, because of the satisfactory machinability of the metal block.

However, the metal block described in the Japanese laid-open patent publication No. Sho 51-6719 consists of a rear metal plate having a film abutting surface and an aperture, and bent portions which are provided respectively at the right edge, the left edge and the lower edge of the rear metal plate. These bent portions are provided independently of one another and hence barely reinforce the rear metal plate. Accordingly, upon plastic molding, when the body proper of the camera body is shrunk or contracted to a large extent due to cooling, then the rear metal plate is somewhat deformed, as in the case where external stresses are applied to a sheet or flat plate from rightwards and leftwards and upwards and downwards. In addition, it is a common practice to prepare the film abutting surface of the rear metal plate by milling, after the molding of a body proper of a camera body. However, if a large stress is applied thereto widthwise, i.e. in the direction perpendicular to the rear metal plate upon machining, then the rear metal plate is deformed, resulting in impaired flatness of a film which abuts film rail surfaces.

Furthermore, upon the plastic molding of the body proper of a camera body by using a metal block as an insert, the metal block is fitted in dies for a body proper, and then secured in position by mating dies or die halves, followed by pouring molten thermoplastic into the dies. However, with a metal block such as described in the Japanese laid-open patent publication No. Sho 51-6719 in which the metal block is used as an insert, bent portions thereof directed to the right and left and upwards and downwards are readily deformed due to external stresses, so that the mere mating of dies would not lead to reliable location of metal block therein.

In general, an aperture defining an area of an image of an object, which is to be projected onto a film, is located in the center of the camera body. In addition, provided on the opposite sides of the aperture are (i) a box shaped portion, to which part of a shutter charging mechanism and a film feeding mechanism are attached, and which includes a cavity housing a film take-up spool and a sprocket therein, and (ii) another box shaped portion, to which a film unwinding mechanism is attached and which has a cavity housing a film cartridge therein. A camera body having the aforesaid metal block and plastic-molded body proper is no exception to this. As shown in the Japanese laid-open patent publication No. Sho 51-6719, a frame aperture defining an area of an image of an object, which is projected onto the film, is positioned in the metal block substantially in its center, and the aforesaid box shaped portions are formed as part of body proper made of plastic, with the metal block being incorporated therein as an insert, and the box shaped portions are positioned on the opposite sides of the metal block, while being continuous with each other through the medium of interconnecting portions of the body proper of a camera body, which portions extend along the upper and lower edges of the metal block, respectively.

Moreover, in the case where a camera body is plastic-molded, with an aluminum piece used as an insert, a molten light alloy is generally poured into such a cavity in a die, which corresponds to one of the right-hand and left-hand box shaped portions, and then the molten light alloy thus poured is directed through cavities corresponding to interconnecting portions into a cavity corresponding to the other box-shaped portion. A framing aperture defining an area of an image of an object, which is projected onto a film and a film abutting surface are prepared separately after the molding. However, the process for pouring a molten plastic into a cavity corresponding to one of the box shaped portions only meets with partial success for a camera body to be plastic molded, with a metal block used as an insert. In other words, in case a light alloy of such as aluminum is used to cast a camera body, there may be adopted large spaces or cavities in dies for the aforesaid interconnecting portions. In contrast thereto, where the body proper of the camera body is plastic-molded, with a metal block used an an insert, the film abutting surface of the metal block should be machined after the molding, so that the metal block is not entirely covered with the aforesaid interconnecting portions, and hence a portion of the metal block to be machined after molding is kept exposed. This necessarily results in a decrease in cross-sectional area of the interconnecting portions. As a result, when the molten plastic is poured through such a cavity in dies, which corresponds to one box-shaped portion, into a cavity corresponding to the other box-shaped portion, a smooth molten plastic flow cannot be achieved. Yet, molten plastic is cooled during its flowing through the cavities corresponding to the interconnecting portions, so that blow holes tend to be produced in the other box-shaped portion, thus lowering the strength thereof.

Yet further, the camera body as shown in the Japanese laid open patent publication No. Sho 51-6719 suffers from the drawback that a metallic block tends to be slid off, breaking the body proper when a large load is applied thereon upon treatment thereof after molding of the body proper if insertion of the metal block into the body proper is shallow. On the contrary thereto, if the insertion is deep so that the metal block is fully sandwiched by the body proper, then the thickness of the body proper inevitably increases, which results in bulkiness of the camera body.

SUMMARY OF THE INVENTION

It is, accordingly, an object of the present invention to provide an improved plastic camera body which does not possess the above-described drawbacks.

Another object of the present invention is to provide an improved camera body which is reinforced by inserting a metal block into a plastic molded body proper and which possesses a firmer coupling between the metal block and the plastic molded body proper as well as high dimensional accuracy.

Still another object of the present invention is to provide an improved plastic camera body which possesses great strength as well as high dimensional accuracy and which is minimumly affected by modling shrinkage.

Yet another object of the present invention is to provide a method for manufacturing an improved camera body which is of the type reinforced by inserting a metal block into a plastic molded body proper and which possesses higher strength than conventional camera bodies of similar type.

In accomplishing the above objects, the camera body of the present invention is provided with a metal block inserted in a plastic molded body proper and having perforations which are packed and filled with a part of the plastic constituting a pair of interconnecting portions of the body proper. The interconnecting portions extend along the rear wall of the metal block and interconnect a pair of main portions of the body proper, which main portions are laterally separated from one another and disposed at opposite sides of the metal block. The metal block is formed with a frame delineating exposure aperture, an abutting surface on which a film pressure plate of a camera is abuttable and a mount surface to which a metal front unit is attached. The metal front unit has a mount surface to which an objective lens barrel is attachable.

With the above construction, high accuracy is obtained in flange-back, i.e. the distance between the mount surface of the metal front unit and the abutting surface of the metal block since this depends on only a metal construction consisting of the metal front unit and the metal block. In addition, as the plastic which is packed and filled in the perforation of the metal block serves to reinforce the coupling between the plastic molded body proper and the metal block, there is less possibility that the metal block can slide off, breaking the body proper when a large load is exerted thereon, even if the insertion of the metal block into the body proper is shallow. Thus the body proper may have small thickness, which results in a compactness of the camera body.

In addition, the method of the present invention includes the step of placing the metal block in dies which define a cavity corresponding to the body proper to be molded and the step of injecting or pouring molten plastic into the cavity from a pair of spaces of the cavity corresponding to the interconnecting portions of the body proper. With this method, the molten plastic flows into a pair of spaces of the cavity corresponding to the main portions of the body proper through the spaces corresponding to the interconnecting portion. The path of the molten plastic flow is shorter than in the above described conventional process, so that it flows more smoothly without being solidified. Accordingly, there is less possibility of blow holes being produced in the main portions of the body proper, thereby providing high strength to the camera body.

In a preferred embodiment of the present invention, the perforations of the metal block are formed as casting holes which facilitates casting of the metal block and thus have larger cross-sectional areas at their ends adjacent to the rear face of the metal wall than at their front ends. Thus, the plastic which is packed and filled in the perforations resists a load exerted on the metal block in the forward and rearward directions as well as a load exerted on the metal block in the lateral and vertical directions.

Further, the metal block has a box shape with only the front wall thereof being open and which includes four side or peripheral walls which are continuous and interconnected with each other end-to-end and a rear wall on which the abutting surface and the exposure framing aperture are provided. With the continuous side walls, the metal block is reinforced against a load exerted thereon in the lateral and vertical direction, so that it will be minimumly deformed due to molding shrinkage of the plastic body proper. Thus, the molding shrinkage affects the camera body to a minimum extent.

In addition, in the preferred embodiment, the ejection or pouring of the molten plastic is performed through the perforations of the metal block which has been positioned in the dies. Each of the perforations is formed near the respective corner of the exposure framing aperture which is of a rectangular shape before placing the metal block in the dies. To increase the strength of the body proper to a much greater extent, a reinforced plastic containing glass fibers is employed for the body proper.

The above and other objects and features of the present invention will become more apparent from the following descriptions taken in conjunction with the accompanying drawings.

DESCRIPTION OF THE PREFERRED EMBODIMENTS

Figure 1:
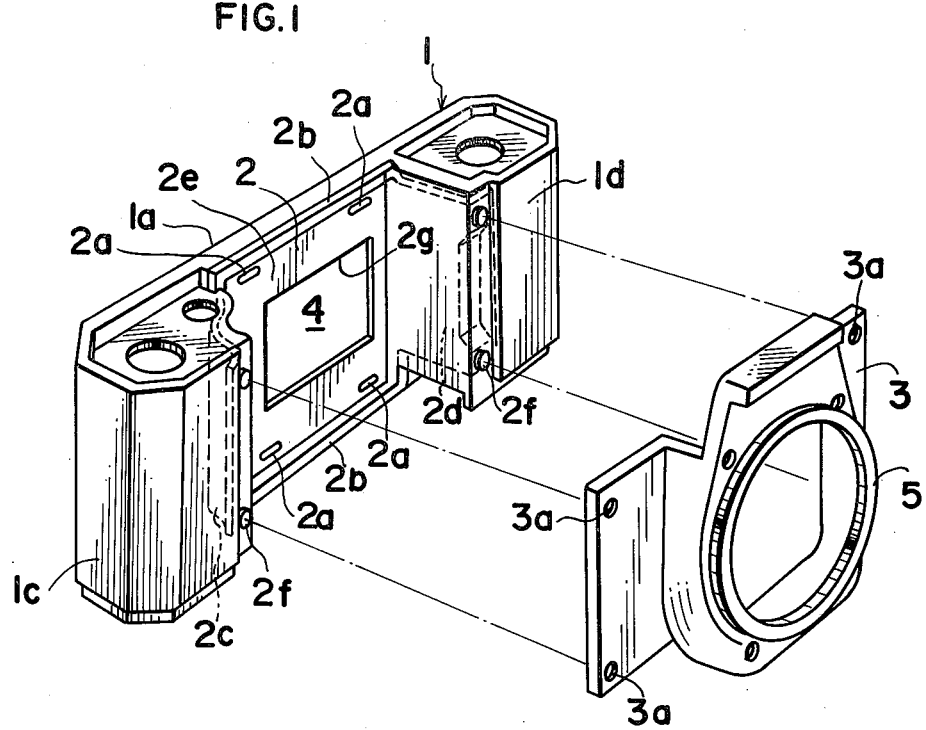
FIG. 1 is an exploded perspective view of a camera body according to an embodiment of the present invention, with the metal block being illustrated inserted into the plastic molded body proper.
Figure 2:
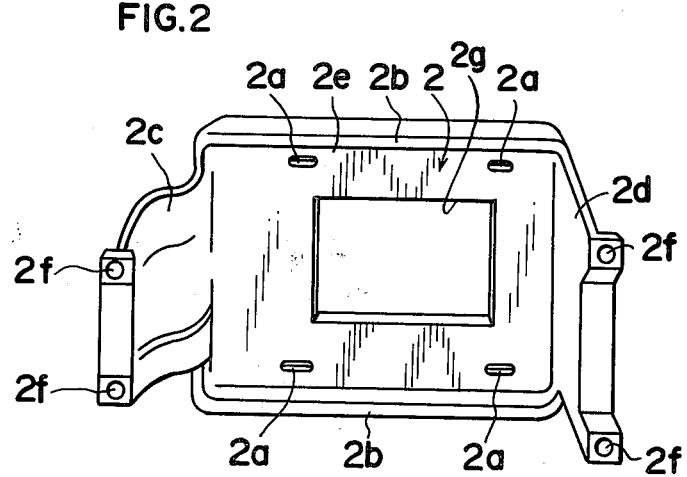
FIG. 2 is a front perspective view of the metal block shown in FIG. 1.

Referring now to the drawings, particularly FIGS. 1 and 2 which show one embodiment of the invention, which includes a camera body, and a metal block or first body section or unit incorporated therein. The reference numeral 1 generally designates the body proper made of a suitable synthetic organic thermoplastic resin which contains glass reinforcing fibers, and 2 and 3 designate respectively a metal block and a front metal plate made of a light metal alloy such as of aluminum or the like.

Metal block 2 is placed in dies for the body proper 1, upon molding of body proper 1 and is secured in position as an insert therein. An aperture 4 in block 2 defines a frame area of an image of an object, which is to be projected onto the film. Gates 2a through which molten plastic enters the die cavity for body proper 1 are provided at the four corners of the rear wall of metal block 2 above and below the four corners of aperture 4. Gates 2a are castholes prepared upon casting the metal block, and hence the cross-sectional areas thereof are gradually decreased rearwards. After the injection molding of body proper 1, plastic remains filled in the gates 2a. Metal block 2 is of a box shape defined by forwardly projecting upper and lower peripheral walls 2b, and forwardly projecting left-hand and right-hand side or peripheral walls 2c, 2d. The box shape of metal block 2 including the end joined peripheral walls reinforces a rear metal plate 2e, on the back surface of which are formed an abutting surface (not shown) for a film pressure plate and rail surfaces (not shown) for guiding a film therealong. As is well known, the film pressure plate is provided on a rear cover of the camera. Side walls 2c, 2d extend forwards and are formed with front-metal-plate-attaching surfaces 2f at the front ends of walls 2c, 2d. Front metal plate 3 is formed on its front surface with a mount 5, to which various interchangeable objective lenses may be attached, and is provided with screw holes 3a therein. Thus, front metal plate 3 is secured to attaching surfaces 2f of metal block 2 by means of screws (not shown), which are inserted through screw holes 3a.

The body proper 1 consists of vertically spaced, laterally extending, parallel cross pieces or interconnecting portions 1a, 1b, and box-shaped portions 1c, 1d which are continuous and integral with portions 1a, 1b on the opposite sides thereof. Interconnecting portions 1a, 1b extend along the upper and the lower edges of metal block 2 so as not to cover a portion of the metal block to form the film abutting surface of the metal block, a portion of the metal block to form film-rail surfaces, and aperture 4. Interconnecting portions 1a, 1b have substantially the same cross-sectional area, and hence the coefficients of contraction of the both interconnecting portions 1a, 1b are substantially the same. Part of a shutter charging mechanism and a film feeding mechanism may be attached to the top surface of box shaped portion 1c, while a film take-up spool and a sprocket may be housed therein. A film rewinding knob and the like are attachable to the top surface of box-shaped portion 1d, while a film cartridge may be housed therein.

Figure 3:
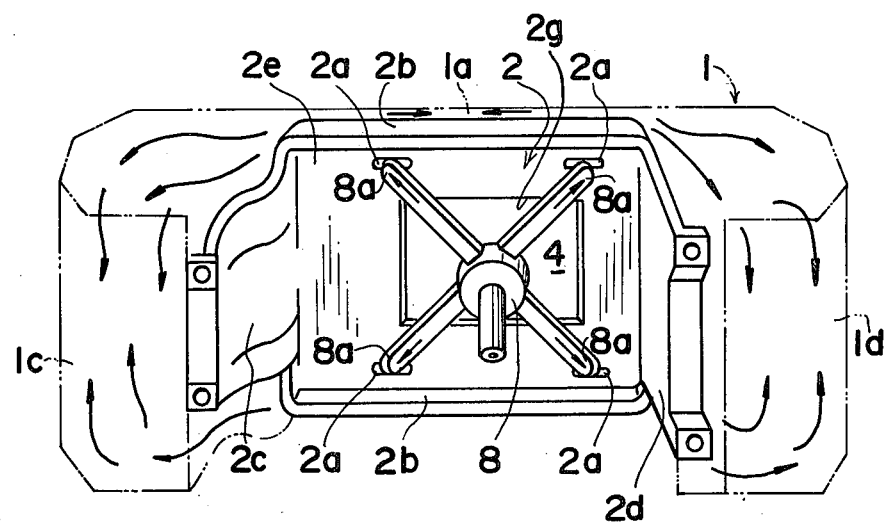
FIG. 3 is a schematic view of the flow of molten plastic which is ejected by a sprue through its runners.
Figure 4:
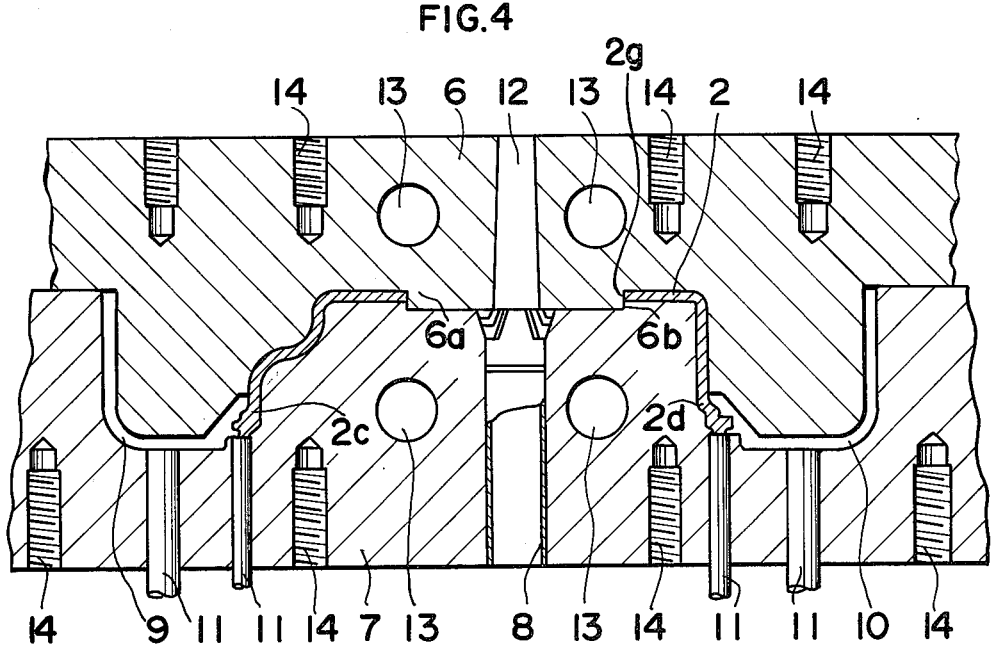
FIG. 4 is a medial horizontal cross-sectional view of the dies and the metal block before the injection of the molten plastic.

FIGS. 3 and 4 illustrate the behaviors of the injected molten plastic, and the condition of the interior of the molding dies, upon the molding of a camera body. Shown at 6, 7, respectively, are a rear die and a front die which constitute the molding dies for the body proper 1. Shown at 8 is a sprue, through which the molten plastic is injected into cavities (not shown) corresponding to interconnecting portions 1a, 1b of the body proper 1 to be molded in rear die 6 and front die 7, as well as into cavities 9, 10 corresponding to box-shaped portions 1c, 1d. Sprue 8 is located in rear die 6, and continuous with runners 8a leading to gates 2a in metal block 2. Shown at 11 are ejector pins for use in ejecting the insert containing molded body following the separation of front die 7 from rear die 6, after the molding of body proper 1. Shown at 12 is a riser, through which excessive molten plastic flows out, at 13 a hole for a heater for heating rear die 6 and front die 7, and at 14 screw holes, through which attaching bolts (not shown) are inserted for fastening rear die 6 and front die 7 to respective platens in the known manner.

A process for manufacturing the camera body of the aforesaid construction is hereinafter described with references to FIGS. 3 and 4. First, metal block 2 is fitted into the rear die from forward, and then front die 7 is fitted on metal block 2 from forwards. As a result, metal block 2 is accurately located by means of rear die 6 and front die 7, while the ends of runners 8a of sprue 8 defined in front die 7 are mated with gates 2a in metal block 2, respectively. In addition, projecting portion 6a corresponding to aperture 4 is provided in the center portion of rear die 6 so that peripheral surface 6b of projecting portion 6a abuts inner peripheral walls 2g of aperture 4.

Molten thermoplastic which contains glass fibers is injected or poured into sprue 8, and then flows through runners 8a and gates 2a into cavities (not shown) corresponding to interconnecting portions 1a, 1b of body proper 1, which cavities are defined by rear die 6 and front die 7. Then, the plastic thus poured flows into cavities 9, 10, corresponding to box-shaped portions 1c, 1d of body proper 1. After the molten plastic has filled the cavities corresponding to interconnecting portions 1a, 1b and cavities 9, 10 corresponding to box-shaped portions 1c, 1d, rear die 6 and front die 7 are cooled so that molten plastic may be solidified. Then, front die 7 and the rear die 6 are separated or opened and the body proper 1 including metal block 2 as an insert is removed. Meanwhile, solidified plastic remain as flashes in a portion corresponding to riser 12 in body proper 1 as well as in gates 2a in metal block 2. However, these flashes may be removed by a suitable means later.

The arrows in FIG. 3 show the direction of flow of molten plastic injected through runners 8a from sprue 8 and then through gates 2a into the die cavities. The cross-sectional areas of the cavities corresponding to interconnecting portions 1a, 1b of body proper 1, which cavities are defined by rear die 6 and front die 7, are relatively small. However, because of the small spacing between cavities 9 and 10 and gates 2a, the molten plastic flows smoothly, without being solidified, and thus flows through the cavities corresponding to interconnecting portions 1a, 1b into cavities 9, 10 corresponding to the box-shaped portions 1c, 1d. Accordingly, there is very little possibility of blow holes being produced in the box-shaped portions 1c, 1d so that a body proper 1 of a high strength may be achieved.

Moreover, during the aforesaid molding process, the plastic-molded body proper greatly shrinks so that considerable stresses act on metal block 2. However, metal block 2 is reinforced by upper wall 2b and side walls 2c, 2d, so that the metal block withstands or overcomes the stresses produced due to the aforesaid shrinkage, and hence the rear plate 2e is not deformed. In addition, the cross-sectional areas of interconnecting portions 1a, 1b of body proper 1 are substantially the same, and hence shrinking forces acting on both interconnecting portions 1a, 1b are substantially equal to one another, so that there is maintained a balance between stresses acting on the upper and lower portions of metal block 2, respectively, with the result that little or no deformation occurs in rear plate 2e of metal block 2. Furthermore, even after front metal plate 3 has been secured to metal block 2 contained in the body proper as an insert, the desired strength of the body proper is maintained. In addition, even in the case where the metal block is subjected to milling so as to provide a film abutting surface and film rail surfaces, the metal block 2 is not deformed under the pressure applied by the tool. Still further, even in the case where an objective lens of considerable weight is coupled to the attaching mount 5 on the front metal plate 3, the metal block 2 is not deformed due to the weight of the lens.

Figure 5:
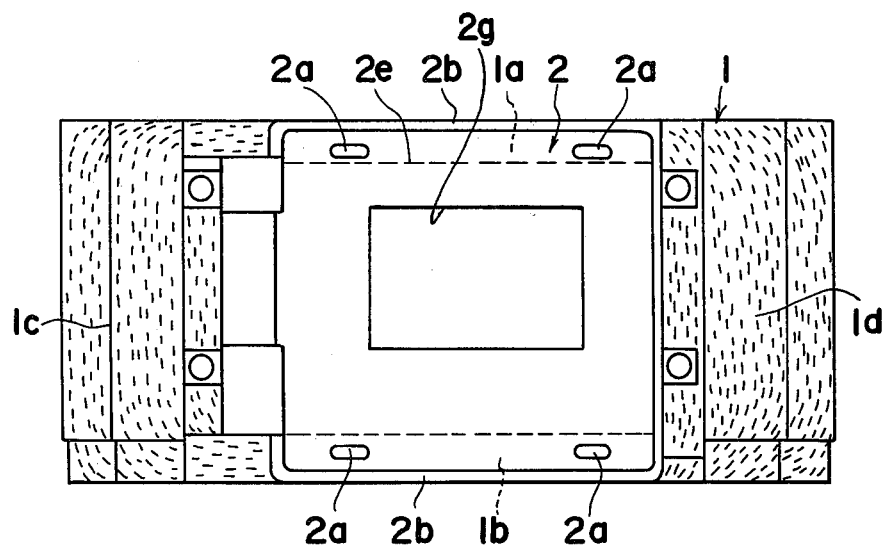
FIGS. 5 and 6 are a front elevational view and plan view of the plastic molded body proper respectively, with the orientation of glass fibers contained in the plastic being schematically illustrated.
Figure 6:
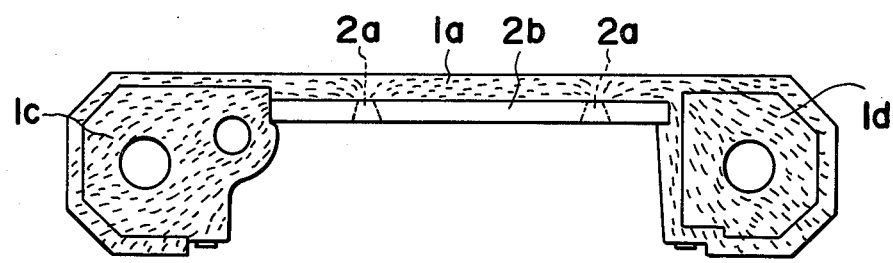

FIGS. 5 and 6 illustrate the directions or orientations of the glass fibers contained in the plastic-molded body proper 1. As shown, the directions of the glass fibers in interconnecting portions 1a, 1b and box-shaped portions 1c, 1d are substantially aligned, showing no marked turbulence. As is well known, the directions or arrangement of the glass fibers largely influence the strength of a molded product of a glass-fiber-containing plastic. With the arrangement of the glass fibers as shown in FIGS. 5 and 6 there is achieved high strength in the lateral and longitudinal directions of the camera body. For instance, results of a tension test imparting a load in the lateral direction reveals that the aforesaid strength corresponds to about 80% of that of an aluminum-alloy body proper of the same shape, while it depends on the kind of plastics employed. Instead of pouring or injecting molten plastic through gates 2a, the molten plastic may be first poured into cavity 9 corresponding to box shaped portion 1c. However, in such a case, a smooth flow of the molten plastic does not occur in the cavities corresponding to interconnecting portions 1a, 1b, and thus the molten plastic can barely flow into cavity 10, while the molten plastic causes a turbulent flow within cavity 9, thus leading to a turbulence in the directions of the glass fibers in box-shaped portion 1c, with the accompanying decrease in strength.

As has been earlier described, after the molding of the camera body, solidified plastic remains in gates 2a in metal block 2, so that the metal block 2 is positively held by body proper 1. Particularly, the cross-sectional areas of gates 2a are gradually decreased rearwards, so that metal block 2 is firmly secured against separation both forwards and rearwards.

Furthermore, according to the present method, rear die 6 and front die 7 are brought into direct abutment with upper wall 2b and side walls 2c, 2d of metal block 2, so that the metal block 2 is further positively located in position, as compared with the case where the metal block is located in the lateral direction of body proper, only by fitting the outer peripheral surface 6b of projecting portion 6a of rear die 6 against inner peripheral walls 2g of aperture 4. Upper and lower walls 2b and side walls 2c, 2d of metal block 2 are continuous with or joined end-to-end with one another, thereby reinforcing one another, so that there is no danger of deformation of metal block 2, and metal block 2 is accurately located in the body proper 1 as an insert.

In addition, according to the present method of manufacturing the body proper of a camera body, the molten plastic flows through cavities (interconnecting portions) to cavities (box-shaped portions) positioned on the opposite sides of the metal block, so that there is no possibility of the occurrence of a hindered flow of molten plastic and a blow hole due to the cooling of molten plastic, thus resulting in a high-strength body proper of a camera body, which is well adapted for mass production.

As has been described above, the camera body thus manufactured minimizes dimensional error in flangeback due to deformation of metal block 2 upon molding and machining after molding, and thus the aforesaid camera body is best suited for use with interchangeable lenses. As a result, a camera having a camera body of the aforesaid construction permits the use of various interchangeable lenses without any limitation.

The box-shaped portion 1c, to which part of a shutter charging mechanism and film feeding mechanism may be attached, and box-shaped portion 1d, to which a film rewinding knob may be attached, are of box shape defined by continuous walls, and high in strength and low in shrinkage with cooling. As a result, there occurs no marked deviation of the attaching positions of members from their predetermined positions, and the attaching operations of these members may be carried out with ease.

While there has been described and illustrated a preferred embodiment, the present invention is by no means limited to the aforesaid embodiment. For instance, according to the aforesaid embodiment, a camera body for use in a single lens reflex camera has been described by way of example, so that the projecting extent of the upper wall 2b of metal block 2 is limited to a small value so as not to hinder the optical path of a view finder optical system. However, in the case of a camera other than a single lens reflex camera, upper wall 2b may be projected forwardly to a larger extent, and lower wall 2b as well may likewise accordingly project. In such case, the attaching surfaces of front metal unit 3 may be provided on the upper wall and lower wall. In addition, according to the aforesaid embodiment, four gates 2a are provided in metal block 2. However, a single gate may be provided on the upper and lower sides of metal block 2, respectively, or the number of gates 2a may be increased. Still further, the gates need not necessarily be provided in the metal block itself. Alternatively, a gate may be provided in rear die 6 or front die 7 in a manner to open to cavities corresponding to interconnecting portions 1a, 1b of body proper 1, so that the gate may be continuous with the runners from a sprue. Moreover, according to the aforesaid embodiment, gates 2a are provided as cast-holes in metal block 2, upon casting of metal block 2. However, the gates 2a may be provided according to other techniques. Metal block 2 should not necessarily be of a box shape as in the aforesaid embodiment.

I claim:

1. A camera body for a camera which includes an objective lens barrel and a film pressure plate for regulating the position of a film in the direction of the optical axis of said objective lens barrel through pressure abutment on the film, said camera including:
    a metal front unit having a mount surface to which said lens barrel is attachable;
    a metal block having an exposure frame aperture, an abutting surface on which said film pressure plate is abuttable, and a mount surface to which said metal front unit is attached; and
    a body proper molded of a plastic with said metal block being inserted therein and having a pair of main portions separated from one another and disposed at opposite sides of said metal block and a pair of interconnecting portions interconnecting said main portions and extending along the rear wall of said metal block,
    the improvement wherein said metal block includes perforations arranged around said exposure frame aperture and said interconnecting portions include integrally formed plastic projections filling said perforations.

2. A camera body as defined in claim 1, wherein said perforations are formed as gates for injecting said plastic into a mold cavity for molding said body proper.

3. A camera body as defined in claim 2, wherein each of said perforations has a smaller cross-sectional area at its rear end adjacent to the rear face of said metal block than at its front face.

4. A camera body as defined in claim 2, wherein said perforations are casting holes for casting of said metal block.

5. A camera body as defined in claim 2, wherein said exposure frame aperture is of rectangular shape and said perforations are formed near the corners of said exposure frame aperture.

6. A camera body as defined in claim 1, wherein said body proper is molded of a glass fiber reinforced plastic.

7. A method of producing a camera body which includes a metal block including a rectangular exposure aperture and a body proper molded of a plastic with said metal block being inserted therein and having a pair of main portions separated from one another and disposed at opposite sides of said metal block and a pair of interconnecting portions interconnecting said main portions and extending along the rear wall of said metal block, said process comprising:
    the step of placing said metal block in dies which define a cavity corresponding to said body proper to be molded; and
    the step of injecting or pouring molten plastic into said cavity from a pair of spaces respectively corresponding to said interconnecting portions, whereby said molten plastic flows into another pair of spaces respectively corresponding to said main portions through said spaces corresponding to said interconnecting portions.

8. The method as defined in claim 7, further comprising the step of forming perforations in said metal block before the placement thereof into said dies, and the injection of said molten plastic is effected through said perforations.

9. The method as defined in claim 8, wherein said step of forming perforations includes the step of forming a perforation near each corner of said exposure frame aperture before the placement of said metal block into said dies.

10. A camera body for a camera which includes an objective lens barrel and a film pressure plate for regulating the position of a film in the direction of the optical axis of said objective lens barrel through pressure abutment on the film, said camera body including:
    a metal front unit to which said objective lens barrel is attachable;
    an open front box-shaped metal block including a rear wall having an exposure frame aperture and an abutting surface on which said film pressure plate is abuttable and four side walls projecting forwardly from said rear wall, the adjacent ends of each pair of proximate side walls being mutually joined whereby said side walls are continuous and form a closed peripheral frame; and
    a body proper molded of a plastic with said metal block being inserted therein and having said metal front unit secured thereto.

11. A camera body as defined in claim 10, wherein said metal block includes a mount surface to which metal front unit is attached.

12. A camera body as defined in claim 11, wherein the front ends of said side walls of said metal block define said mount surface.

13. A camera body as defined in claim 11, wherein said body proper includes a pair of main portions separated from one another and disposed at opposite sides of said metal block and a pair of interconnecting portions interconnecting said main portions with one another and extending along said rear wall of said metal block.

14. A camera body as defined in claim 13, wherein said interconnecting portions are provided above and below said exposure frame aperture respectively and have substantially the same cross-sectional area.

15. A camera body structure comprising an integrally molded main body unit formed of a synthetic organic polymeric resin and including a pair of laterally spaced receptacle side sections and a pair of vertically spaced parallel horizontal cross pieces extending between and integrally formed with the upper and lower parts of said side sections, a rear metal unit including a rear plate extending between and abutting the front faces of said cross pieces and having a rectangular exposure frame aperture and upper and lower coupling perforations offset from said aperture and a pair of opposite walls projecting forwardly from corresponding edges of said rear plate, said cross pieces having forwardly extending projections integrally formed therewith and filling said coupling perforations and said rear metal unit being insert mold anchored to said main body unit and a front lens mounting metal unit including a lens coupling section and extending between and mounted to the front ends of said rear unit forwardly projecting walls.

16. The camera body structure of claim 15 wherein said coupling perforations are forwardly outwardly tapered.

17. A camera body structure comprising an integrally molded main body unit formed of a synthetic organic polymeric resin and including a pair of laterally spaced receptacle side sections and a pair of vertically spaced parallel horizontal cross pieces extending between and integrally formed with the upper and lower parts of said side sections, a rear metal unit, mold insert anchored to said main body unit and including a rear plate extending between and abutting the front faces of said cross pieces and having a rectangular exposure frame aperture and peripheral side and top and bottom walls projecting forwardly from corresponding edges of said rear wall and being end-to-end joined and continuous to form a closed peripheral frame, said side walls abutting said main body unit side sections and an opposite pair of said peripheral walls terminating in mounting faces and a front lens mounting metal unit including a lens coupling section and extending between and secured to said peripheral wall mounting faces.

18. A camera body for a camera which includes an objective lens barrel and a film pressure plate for regulating the position of a film in the direction of the optical axis of said objective lens barrel through pressure abutment on the film, said camera body including:

a metal front unit to which said objective lens barrel is attachable;

a body proper molded of a plastic and including a pair of laterally spaced receptacle side sections and vertically spaced parallel horizontal cross pieces extending between and integrally formed with the upper and lower parts of said side sections;

a metal block, inserted in said body proper upon the molding of said body proper and including a rear wall having an exposure frame aperture and an abutting surface on which said film pressure plate is abuttable and first and second side walls integrally formed with and projecting forwardly from the opposite lateral edges of said rear wall and anchored to said side sections with the mold insertion, said first and second side walls having a mount surface to which said metal front unit is attached; and screw means for fixedly attaching said metal front unit to said mount surface.

19. A camera body as defined in claim 18, wherein said first and second side walls have substantially coplanar front faces defining said mount surface.

20. A camera body as defined in claim 19, wherein said screw means includes four screw members, two of which are screwed into said front surface of said first side wall at vertically spaced positions and the other two of which are screwed into said front face of said second side wall at vertically spaced positions.

* * * * *